United States Patent
Mitani et al.

(10) Patent No.: US 7,771,863 B2
(45) Date of Patent: Aug. 10, 2010

(54) CYLINDRICAL SECONDARY BATTERY

(75) Inventors: Takayuki Mitani, Hitachinaka (JP); Katsunori Suzuki, Nabari (JP)

(73) Assignee: Hitachi Vehicle Energy, Ltd., Ibaraki (JP)

(*) Notice: Subject to any disclaimer, the term of this patent is extended or adjusted under 35 U.S.C. 154(b) by 185 days.

(21) Appl. No.: 11/942,286

(22) Filed: Nov. 19, 2007

(65) Prior Publication Data
US 2008/0182159 A1 Jul. 31, 2008

(30) Foreign Application Priority Data
Nov. 24, 2006 (JP) .............................. 2006-316737

(51) Int. Cl.
*H01M 2/12* (2006.01)
(52) U.S. Cl. .............................. 429/56; 429/53; 429/163
(58) Field of Classification Search ............ 429/47–347
See application file for complete search history.

(56) References Cited

U.S. PATENT DOCUMENTS

| | | | |
|---|---|---|---|
| 4,803,136 A * | 2/1989 | Bowsky et al. ................ | 429/56 |
| 5,741,606 A | 4/1998 | Mayer et al. | |
| 5,853,912 A * | 12/1998 | Naing et al. .................. | 429/61 |
| 6,242,126 B1 | 6/2001 | Mori et al. | |
| 2003/0013005 A1 | 1/2003 | Chang | |

FOREIGN PATENT DOCUMENTS

| | | |
|---|---|---|
| CN | 2338881 Y | 9/1999 |
| CN | 2824298 Y | 10/2006 |
| JP | 6-140011 A | 5/1994 |
| JP | 07254402 * | 10/1995 |
| JP | 8-7866 A | 1/1996 |
| JP | 10-92397 A | 4/1998 |
| JP | 2004-134204 A | 4/2004 |

(Continued)

OTHER PUBLICATIONS

Machine translation of JP 2004-134204 (Apr. 2004).*

(Continued)

*Primary Examiner*—Dah-Wei D Yuan
*Assistant Examiner*—Katherine Turner
(74) *Attorney, Agent, or Firm*—Roberts Mlotkowski Safran & Cole, P.C.; Thomas W. Cole

(57) ABSTRACT

A cylindrical secondary battery where safety can be secured even when an external pressure accompanying rapid deformation of the battery acts on the battery is provided in a battery having a large capacity. A lithium ion secondary battery has a capacity of 14 Ah, where an upper lid is fixed to a battery can which receives an electrode winding grope therein. The upper lid includes a diaphragm 2 formed with a rupturing valve and an upper lid cap whose peripheral edge portion is fixed to a peripheral edge portion of the diaphragm 2. The rupturing valve includes a rupturing groove 8 with a V-shaped section formed on a surface of the diaphragm 2 positioned on the side of the upper lid cap and a rupturing groove 18 with a U-shaped section formed on a surface of the diaphragm 2 positioned on the side of the electrode winding group so as to correspond to the position of the rupturing groove 8.

9 Claims, 6 Drawing Sheets

FOREIGN PATENT DOCUMENTS

JP          2004-319465 A    11/2004

OTHER PUBLICATIONS

JPO IPDL machine translation of JP07254402, published Oct. 3, 1995, retrieved on Mar. 22, 2010.*

Office Action dated Apr. 3, 2009 issued by the State Intellectual Property Office of China in corresponding Chinese Patent Application No. 200710194603.X.

European Search Report dated Mar. 4, 2009 from corresponding European Patent Application No. EP 07 12 1241.

Office Action dated Apr. 28, 2009 issued by the Japanese Patent Office in corresponding Japanese Patent Application No. 2006-316737.

* cited by examiner

CYLINDRICAL SECONDARY BATTERY

FILED OF THE INVENTION

The present invention relates to a cylindrical secondary battery, and in particular to a cylindrical secondary battery that is provided with a mechanism for cutting off a current due to inversion of a diaphragm caused by internal pressure rising, where the diaphragm is formed with a rupturing valve.

DESCRIPTION OF THE RELATED ART

Conventionally, sealed cylindrical secondary batteries are widely used in home electric appliances. In recent years, especially, lithium secondary batteries of the sealed cylindrical secondary batteries are frequently used. Since the lithium secondary battery has a high energy density, it is being developed as an in-vehicle power source for an electric vehicle (EV) or a hybrid electric vehicle (HEV).

However, when the sealed cylindrical secondary battery falls in an overcharged state due to a failure of a charging device, such a phenomenon may occur that gas is generated according to decomposition of battery electrolyte so that an internal pressure in the battery rises considerably. Especially, in a lithium secondary battery using organic solvent as solvent for electrolyte, since a battery capacity becomes large, more reliable explosion-proof action is required. Therefore, a secondary battery having an explosion-proof mechanism where a thin metal plate having a projecting portion projecting downwardly at a central portion thereof is welded to a thick metal plate through the projecting portion and peripheral portion of these metal plates are crimped and fixed has been disclosed (see JP-A-08-07866).

The present inventors proposed a sealed lithium secondary battery provided with an upper lid incorporated with an explosion-proof mechanism previously (see JP-A-2004-134204). As shown in FIG. 4, an upper lid 40 includes an upper lid cap 1 which is made from iron, nickel-plated, formed in a disc shape, and also serves as an external output terminal. A cylindrical projecting portion is formed at a central portion of the upper lid cap 1, and an exhaust port is formed in the projecting portion. A peripheral edge portion of the upper lid cap 1 is fixed to a peripheral portion of a dish-shaped diaphragm 22 made from aluminum alloy and having a flat portion at a central portion. A flat portion of a central portion of a connection plate 6, the flat portion projecting toward the diaphragm 22 and the connection plate 6 being made from aluminum alloy and being connected to one of a cathode and a anode, is electrically and mechanically connected to a flat portion of the diaphragm 22 by resistance welding or the like. An inverting pressure to the diaphragm 22 is set by resistance welding such that activation (inversion of the diaphragm 22 toward the upper lid cap 1) is caused when a battery internal pressure reaches a predetermined pressure. A rupturing valve is formed in the diaphragm 22 and the rupturing valve is formed on its surface positioned on the side of the upper lid cap 1 of the diaphragm 22 with a rupturing groove 28 ruptured when the battery internal pressure reaches the predetermined pressure. As shown in FIG. 5A, the rupturing groove 28 is configured to include a circular rupturing groove 28a and radial rupturing grooves 28b radially extending from the circular rupturing groove 28a toward a peripheral edge of the diaphragm 22. A rupturing pressure action on the rupturing groove 28 is set to be higher than the inverting pressure acting on the diaphragm 22.

In an explosion-proof mechanism with such a structure, when the battery internal pressure acting on a surface of the diaphragm 22 positioned on the side of the connection plate 6 reaches the inverting pressure acting on the diaphragm 22, the diaphragm 22 is inverted to the side of the upper lid cap 1 and joint between the diaphragm 22 and the connection plate 6 is broken, so that a current between the connection plate 6 and the upper lid cap 1 is cut off. When the battery internal pressure further rises to reach a rupturing pressure for rupturing the rupturing groove 28, the rupturing groove 28 is ruptured, so that gas in the battery is discharged, which results in lowering of the battery internal pressure.

However, when a high capacity of a battery is realized, as shown in FIG. 6, if an external force accompanying rapid deformation of the battery acts on the battery, such a phenomenon arises in the abovementioned explosion-proofing mechanism that the diaphragm 22 inverted due to rapid rising of the battery internal pressure is pressed on the upper lid cap 1. In this case, since rupturing of the rupturing groove 28 formed on the surface of the diaphragm 22 positioned on the upper lid cap 1 is blocked by the upper lid cap 1, so that gas discharging from the battery becomes uncertainty. Therefore, such a problem is caused that reduction of the battery internal pressure cannot be achieved so that it becomes difficult to secure safety. The problem does not occur in a small-sized battery with a capacity of about 1.3 Ah used in the abovementioned home electric appliances or the like, but it becomes significant in a battery with a large capacity of 3.5 Ah or more, especially, exceeding 14 Ah.

SUMMARY OF THE INVENTION

An object of the present invention is to provide a cylindrical secondary battery that can secure safety even if an external force accompanying rapid deformation of the battery acts on the battery in a secondary battery with a large capacity.

According to one aspect of the present invention, there is provided a cylindrical secondary battery that is provided with a mechanism for cutting off a current due to inversion of a diaphragm caused by internal pressure rising, the diaphragm being formed with a rupturing valve, wherein the rupturing valve is formed with a groove with a V-shaped section on a surface of the diaphragm opposite to a surface thereof on which an internal pressure acts and a groove with a U-shaped section is formed on the surface of the diaphragm on which the internal pressure acts so as to correspond to a position where the groove with a V-shaped section is formed.

In the cylindrical secondary battery according to the aspect, since the groove with a V-shaped section is formed on the surface of the diaphragm opposite to the surface on which an internal pressure acts and the groove with the U-shaped section is formed on the surface of the diaphragm on which an internal pressure acts so as to correspond to a position where the groove with a V-shaped section is formed in the rupturing valve, a current can be cut off due to inversion of the diaphragm caused by an internal pressure at a time of rapid internal pressure rising caused by the external force accompanying rapid deformation of the battery. Further, since the internal pressure concentrates on the groove with a U-shaped section, the groove with a V-shaped section formed corresponding to the groove with a U-shaped section and the groove with a U-shaped section are ruptured securely, so that the rupturing valve is opened. As a result, the internal pressure can be reduced so that safety can be secured.

In this case, it is preferable that a depth of the groove with a U-shaped section is made smaller than that of the groove with a V-shaped section. The groove with a V-shaped section may be formed to include a combination of a ring-like curved groove and a straight groove whose one end crosses the curved groove, the other end of the straight groove being positioned on the side of an outer periphery of the diaphragm. At this time, when a depth of the other end of the straight groove is made smaller than that at the one end thereof, a thickness of the diaphragm is secured at the other end of the straight groove, so that the diaphragm can be inverted to cut off a current before the straight groove is ruptured even at a time of overcharging performed at a high rate of a current value.

According to the present invention, since the groove with a V-shaped section is formed on the surface of the diaphragm opposite to the surface thereof on which an internal pressure acts and the groove with a U-shaped section is formed on the surface of the diaphragm on which an internal pressure acts so as to correspond to a position where the groove with a V-shaped section is formed in the rupturing valve, a current can be cut off due to inversion of the diaphragm caused by an internal pressure at a time of rapid internal pressure rising caused by the external force accompanying rapid deformation of the battery. Further, since the internal pressure concentrates on the groove with a U-shaped section, the groove with a V-shaped section and the groove with a U-shaped section are ruptured securely, so that the rupturing valve is opened. As a result, such an effect can be obtained that the internal pressure can be reduced and safety can be secured.

DETAILED DESCRIPTION OF THE PREFERRED EMBODIMENTS

An embodiment where the present invention has been applied to a cylindrical lithium ion secondary battery will be explained below with reference to the drawings.

(Configuration)

Figure 1:
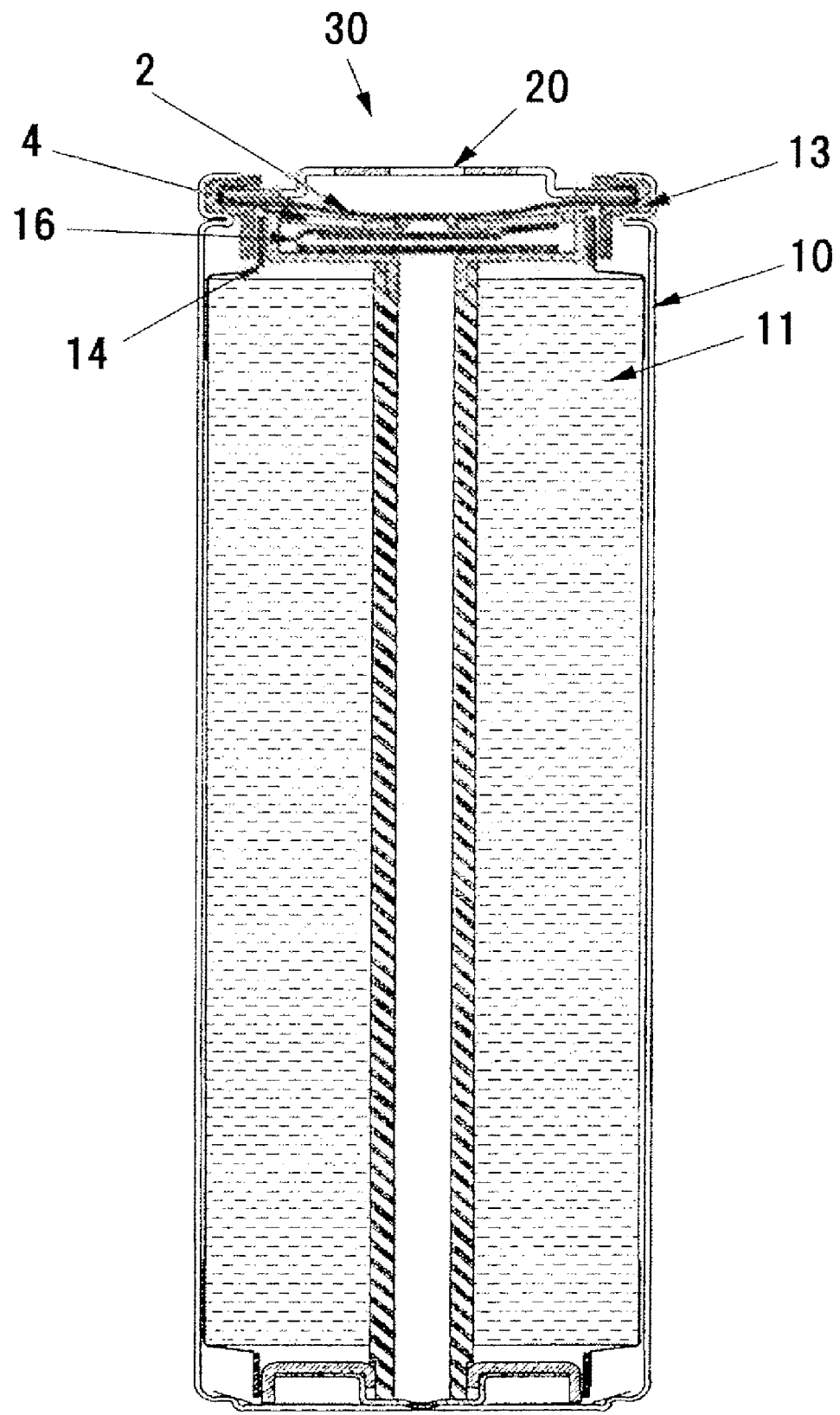
FIG. 1 is a sectional view of a cylindrical lithium ion secondary battery according to an embodiment to which the present invention can be applied.

As shown in FIG. 1, a cylindrical lithium ion secondary battery (a cylindrical secondary battery) 30 according to the embodiment is provided with a electrode winding group 11 formed by winding a cathode plate and an anode plate around a hollow cylindrical core member via a separator comprising a fine-porous film made from polyethylene and allowing passage of lithium ions such that both the electrode plates does not contact with each other directly.

The cathode plate configuring the electrode winding group 11 is obtained by adding carbon powder of 5 weight parts serving as electrically-conductive material and polyvinylidene-fluoride (hereinafter, abbreviated to PVDF) of 5 weight parts serving as binder in lithium-manganese composite oxide powder of 90 weight parts which is cathode active material, applying slurry obtained by adding N-methylpyrrolidone (hereinafter, abbreviated to NMP) serving as dispersion media in the resultant material and mixing the same on both faces of an aluminum foil (cathode current collector) with a thickness of 20 µm, drying the aluminum foil, then pressing the same, and cutting the foil in a rectangular shape while leaving a portion for current collection. A cathode tab is formed on the portion left for current collection. As the abovementioned lithium-manganese composite oxide, lithium-manganate ($LiMn_2O_4$), a compound obtained by replacing or doping lithium site or manganese site of $LiMn_2O_4$ by another metal element and expressed by chemical formula $Li_{1+X}M_yMn_{2-x-y}O_4$ (M indicating one kind of Li, Co, Ni, Fe, Cu, Al, Cr, Mg, Zn, V, Ga, B, and F), or layered lithium manganate ($LiMn_xM_{1-x}O_2$) (M indicating one kind of Li, Co, Ni, Fe, Cu, Al, Cr, Mg, Zn, V, Ga, B, and F) can be used.

On the other hand, the anode plate is obtained by adding PVDF of 10 weight pars serving as binder in amorphous carbon powder of 90 weight parts which is anode active material, applying slurry obtained by adding NMP serving as dispersion media in the resultant material and mixing the same on both faces of a rolled copper foil (anode current collector) with a thickness of 10 µm, drying the copper foil, pressing the same, and cutting the foil in a rectangular shape while leaving a portion for current collection. An anode tab is formed on the portion left for current collection. As the anode active material, not only the abovementioned amorphous carbon but also material which can store and discharge lithium or metal lithium can be used.

The electrode winding group 11 is received in a cylindrical battery can 10 with a bottom made from metal, and the abovementioned cathode tab and anode tab are disposed such that they are positioned on both end faces of the electrode winding group 11 opposed to each other. An anode electricity collecting ring for current collection is fixed at a lower end portion of the core, and the anode tab is connected at a peripheral edge portion of the anode electricity collecting ring by ultrasonic welding. The anode electricity collecting ring is connected to an inner bottom face of the battery can 10 by resistance welding. On the other hand, a cathode electricity collecting ring 14 for current collection is fixed to an upper end portion of the core, and the cathode tab is fixed to a peripheral edge portion of the cathode electricity collecting ring 14 by ultrasonic welding. One side of a cathode lead plate 16 formed by laminating rectangular aluminum foils and bent in an approximately U shape is welded to the cathode electricity collecting ring 14. The other side of the cathode electricity collecting ring 14 is welded to a bottom face of a splitter 4 made from aluminum alloy and configuring an upper lid 20 disposed above the electrode winding group 11.

Figure 2:
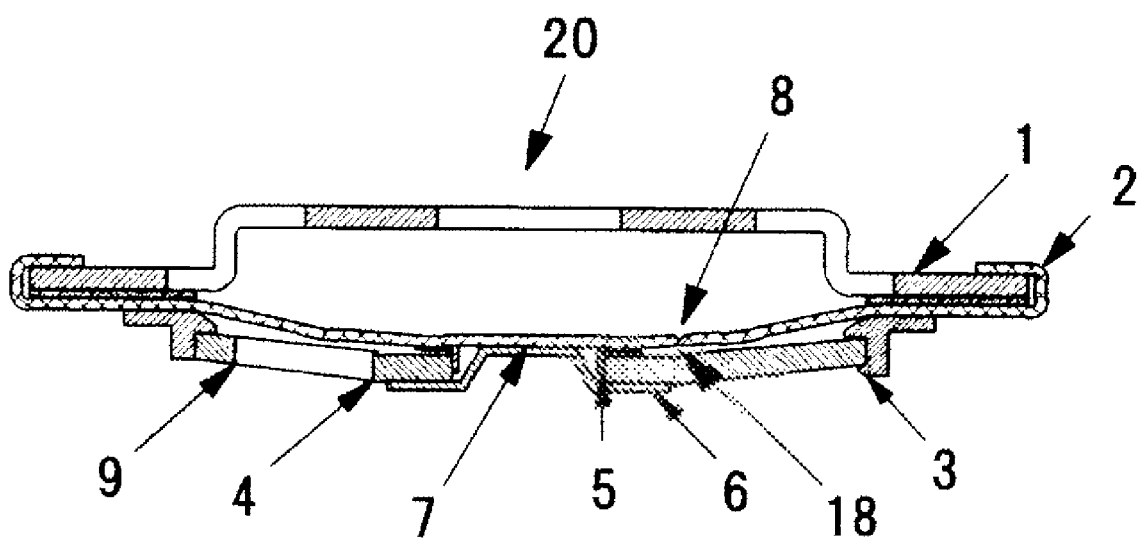
FIG. 2 is a sectional view of an upper lid of the cylindrical lithium ion secondary battery according to the embodiment.

As shown in FIG. 2, the upper lid 20 has a disc-shaped upper lid cap 1 made from iron and nickel-plated. A cylindrical projection projecting upwardly is formed at a central portion of the disc-shaped upper lid cap 1, and an exhaust port (an opening) for exhausting gas generated inside the battery is formed on an upper wall of the projecting portion. The upper lid cap 1 functions as a cathode external output terminal. A diaphragm 2 is disposed below the upper lid cap 1, and a peripheral edge portion of the upper lid cap 1 is crimped at a peripheral edge portion of the diaphragm 2. The diaphragm 2 is made from aluminum alloy and has a dish shape formed with a bottom portion positioned below. The dish-shaped bottom portion is flat and forms a central portion of the diaphragm 2. A rupturing valve is formed in the diaphragm 2. The rupturing valve includes a rupturing groove (a groove with a V-shaped section) 8 formed on a surface of the diaphragm 2 positioned on the side of the upper lid cap 1 and a rupturing groove (a groove with a U-shaped section) 18 formed on a surface of the diaphragm 2 positioned on the side of the electrode winding group 11 (on the side of a connection plate 6 described later) so as to correspond to a position where the rupturing groove 8 is formed. The rupturing groove 8 and the rupturing groove 18 are set to be ruptured when a battery internal pressure reaches a predetermined pressure (a rupturing pressure).

Figure 3A:
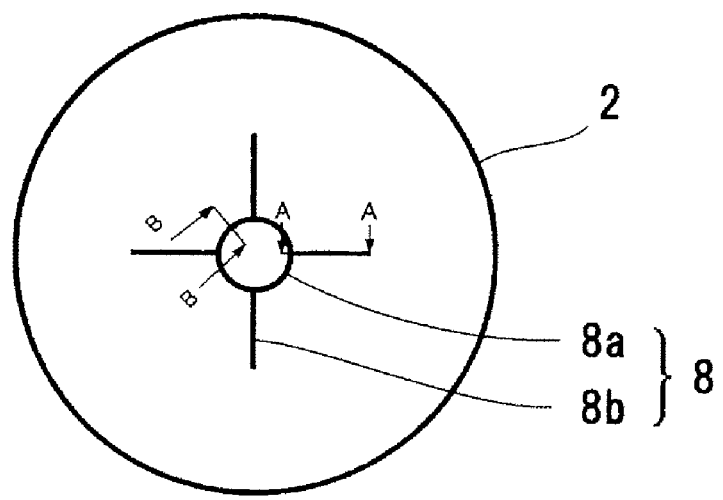
FIGS. 3A to 3C show rupturing grooves formed on a diaphragm configuring the upper lid of the cylindrical lithium ion secondary battery according to the embodiment, FIG. 3A being a plan view of the diaphragm, FIG. 3B being a sectional view of the diaphragm taken along line A-A in FIG. 3A, and FIG. 3C being a sectional view taken along line B-B in FIG. 3A.
Figure 3B:
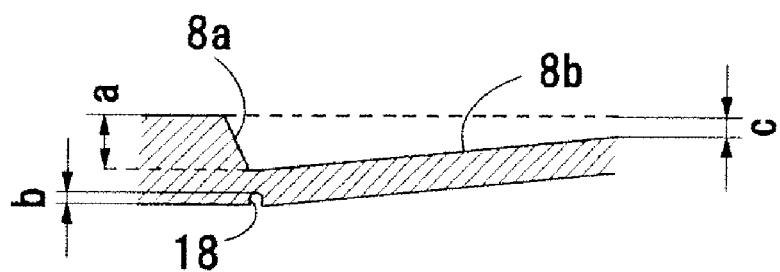
Figure 3C:
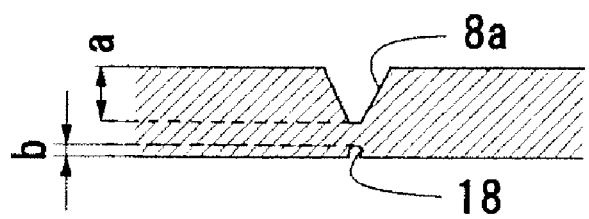
Figure 4:
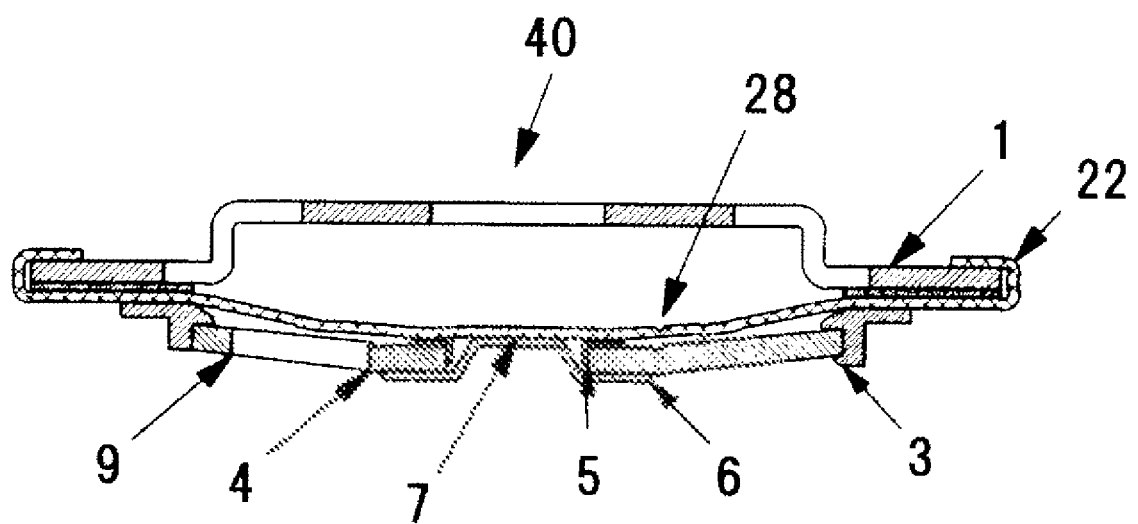
FIG. 4 is a sectional view of an upper lid of a conventional cylindrical lithium ion secondary battery.

As shown in FIG. 3A, the rupturing groove 8 is formed by combining a circularly-curved or ring-shaped rupturing groove 8a positioned between a central portion and a peripheral edge portion of the diaphragm 2 and straight rupturing grooves 8b whose one ends cross the rupturing groove 8a. The other ends of the rupturing grooves 8b are positioned nearer the peripheral edge portion of the diaphragm 2 than the rupturing groove 8a of the diaphragm 2. The rupturing grooves 8b are formed at four positions on the diaphragm 2. That is, the rupturing grooves 8b are formed so as to extend from the rupturing groove 8a radially toward the peripheral edge portion of the diagram 2. As shown in FIG. 3B and 3C, the rupturing groove 8 is formed to have a V-shaped section. A depth of the rupturing groove 8a is set to "a" (mm). One end of each rupturing groove 8b crossing the rupturing groove 8a is set to the same depth "a" as that of the rupturing groove 8a, and a depth of the other end thereof positioned on the side of the peripheral edge portion of the diaphragm 2 is set to be "c" (mm) which is smaller than the depth "a". On the other hand, the rupturing groove 18 is formed in a circularly-curved shape at a position corresponding to the position of the rupturing groove 8a. The rupturing groove 18 is formed to have a U-shaped section. A depth of the rupturing groove 18 is set to "b" (mm) smaller than the depth "a" of the rupturing groove 8a.

As shown in FIG. 2, the connection plate (connection member) 6 with a thickness which is thinner than that of the diaphragm 2 and is made from aluminum alloy is disposed at a central portion of the diaphragm 2 positioned on the side of the electrode grounding group 11. An upper face of a central portion of the connection plate 6 is flat and projects upwardly (toward the diaphragm 2), and it is electrically and mechanically joined to a central portion of the diaphragm 2 at a joined portion 7 by resistance welding. Joined strength of the diaphragm 2 and the connection plate 6 is adjusted by the resistance welding such that, when an internal pressure in the lithium ion secondary battery 30 reaches a predetermined pressure, the diaphragm 2 is activated (inversion from the side of the electrode winding group 11 to the side of the upper lid cap 1). Thus, the upper lid 20 has a current cutting-off mechanism where joint of the joined portion 7 is cancelled due to internal pressure rising and the diaphragm 2 is inverted so that a current is cut off.

A flat torus-shaped (a shape where a central portion of a dish is bored) splitter 4 is cramped between a bottom face of the central portion of the diaphragm 2 and a peripheral edge portion of the connection plate 6 via a ring-shaped bush 5 whose flange portion abuts on a bottom face of the central portion of the diaphragm 2 and which is made from polypropylene resin. Therefore, the splitter 4 and the connection plate 6 are electrically connected to each other. A plurality of through-holes 9 causing the interior of the battery and the diaphragm 2 to communicate with each other is formed in the splitter 4. A portion of the diaphragm 2 present along the splitter 4 and the splitter 4 are accommodated in the cathode current collecting ring 14 shown in FIG. 1. A space defined by a bottom face of the splitter 4 and an inner face of the cathode current collecting ring 14 is formed such that a central portion thereof is larger in a height direction of the battery than a peripheral portion thereof. The cathode lead plate 16 is folded near the peripheral portion of the space and accommodated in the space. An outer peripheral portion of the splitter 4 is retained by an insulating ring 3 with an approximately T shape made from resin so as to be spaced from the bottom face of the diaphragm 2 by a predetermined distance. The insulating ring 3 has a plurality of projections for supporting an outer peripheral portion of the splitter 4 on an inner face, and the insulating ring 3 and the projections are formed integrally. Incidentally, the diaphragm 2, the splitter 4, the upper lid cap 1, and the connection plate 6 are formed by press working.

As shown in FIG. 1, after non-aqueous electrolyte is poured in the battery can 1 by a predetermined amount, a peripheral edge portion of the upper lid 20 is crimped and fixed to the battery can 10 via the gasket 13 so that the battery is sealed. As the non-aqueous electrolyte, electrolyte obtained by solving lithium salt such as lithium phosphate hexafluoride or lithium borate tetrafluoride in such organic solvent as ethylene carbonate, dimethyl carbonate in an amount of about 1 mole/liter is used. The lithium ion secondary battery 30 according to the embodiment has a capacity exceeding 14 Ah. Incidentally, as the non-aqueous electrolyte, for example, ones obtained by solving lithium salt in solvent comprising simple substance or mixture of organic solvents such as carbonates, sulfolanes, ethers, or lactones can be used instead of the examples described above.

(Operation and the Like)

Next, an operation of the lithium ion secondary battery 30 according to the embodiment at a battery abnormal time and the like will be explained.

In the lithium ion secondary battery 30 according to the embodiment, an inverting pressure where joint of the joined portion 7 is released and the diaphragm 2 is inverted to the side of the upper lid cap 1 and a rupturing pressure where the rupturing groove 8 and the rupturing groove 18 formed in the diaphragm 2 are ruptured are set, where the inverting pressure is set to a value (for example, 1.5 MPa) larger than the atmospheric pressure and the rupturing pressure is set to a value (for example, 2 MPa) larger than the inverting pressure.

When the battery internal pressure rises so that the battery internal pressure acting on a surface of the diaphragm 2 positioned on the side of the electrode winding group 11 reaches the inverting pressure, the connection plate 6 is broken (joint of the joined portion 7 of the bottom face of the central portion of the diaphragm 2 and the upper face of the central portion of the connection plate 6 is released) so that the diaphragm 2 is inverted from the side of the electrode winding group 11 to the side of the upper lid cap 1. Thereby, since a current path formed by connecting the cathode tab of the electrode winding group 11, the cathode current collecting ring 14, the cathode lead plate 16, the splitter 4, the connection plate 6, the diaphragm 2, and the upper lid cap 1 (the cathode external output terminal) in this order is cut off at a portion between the connection plate 6 and the diaphragm 2, a current between the upper lid cap 1 and the electrode winding group 11 is stopped. When the battery internal pressure further rises to reach the rupturing pressure, the rupturing groove 8 and the rupturing groove 18 are ruptured. Thereby, the rupturing valve is opened and gas in the battery is exhausted outside the battery via the rupturing valve and the exhaust port formed in the upper lid cap 1, so that the battery internal pressure is lowered. Therefore, even if the lithium ion secondary battery 30 falls in an overcharged state, the lithium ion secondary battery 30 can be put in an unusable state safely. Incidentally, since the inverting pressure is set to a value larger than the atmospheric pressure, when the diaphragm 2 is once inverted, the bottom face of the central portion of the diaphragm 2 and the upper face of the central portion of the connection plate 6 are prevented from coming in contact with each other again.

When an external force accompanying rapid deformation to the lithium ion secondary battery 30 acts on the secondary battery 30 (for example, when the lithium ion secondary battery 30 is crushed by an external pressure or when a foreign material such as a nail pierces the lithium ion secondary battery 30), the cathode plate and the anode plate in the electrode winding group 11 are short-circuited, so that the non-aqueous electrolyte is decomposed at an accelerating pace to generate gas. Especially, since the lithium ion secondary battery 30 according to the embodiment has the capacity exceeding 14 Ah and it includes much non-aqueous electrolyte, the battery internal pressure rapidly rises accompanying thermorunaway. In the lithium ion secondary battery 30, the rupturing groove 8 is formed on the surface of the diaphragm 2 positioned on the side of the upper lid cap 1 and the rupturing groove 18 is formed on the surface of the diaphragm 2 positioned on the side of the electrode winding group 11 so as to corresponding to the position where the rupturing groove 8 is formed. Therefore, pressure acting on the surface of the diaphragm 2 positioned on the side of the electrode winding group 11 when the battery internal pressure rises rapidly tends to concentrate on the rupturing groove 18. Thereby, even if the diaphragm 2 is inverted toward the upper lid cap 1, it is prevented from being pressed on the inside of the upper lid cap 1, so that both the rupturing groove 8 and the rupturing groove 18 are ruptured reliably. As a result, since the rupturing valve is opened, gas in the battery can 10 is discharged outside the battery via the rupturing valve and the exhaust port formed in the upper lid cap 1. Accordingly, in the lithium ion secondary battery 30, even when an external pressure accompanying rapid deformation of the battery acts on the battery, the battery internal pressure can be reduced reliably, so that safety of the battery can be secured.

Further, if the depth "b" of the rupturing groove 18 is larger than the depth "a" of the rupturing groove 8a, when the battery internal pressure rapidly rises, a pressure concentrating on the rupturing groove 18 becomes excessively large, so that there is a possibility that the rupturing groove 18 is ruptured before the diaphragm 2 is inverted. In the lithium ion secondary battery 30 according to the embodiment, the depth "b" of the rupturing groove 18 is formed to be smaller than the depth "a" of the rupturing groove 8a. Therefore, even if a pressure concentrates on the rupturing groove 18, the rupturing groove 18 and the rupturing groove 8 are prevented from being ruptured before the diaphragm 2 is inverted, so that a current can be stopped reliably owing to inversion of the diaphragm 2.

In the lithium ion secondary battery 30 according to the embodiment, the rupturing groove 8 has a configuration obtained by combining the circularly-curved rupturing groove 8a and the straight rupturing grooves 8b whose one ends cross the rupturing groove 8a, where the rupturing groove 18 is formed in a circularly-curved or ring-shaped shape. The rupturing groove 18 with a U-shaped section is formed at a position corresponding to the rupturing groove 8a with a V-shaped section. Therefore, pressure acting on the diaphragm 2 when the battery internal pressure rapidly rises tends to concentrate on crossing portions of the rupturing groove 8a and the rupturing grooves 8b, so that gas can be discharged easily. When the diaphragm 2 is inverted due to rising of the battery internal pressure, a V-angle of the V-shaped groove of the rupturing groove 8a is expanded, but an inlet portion of the U-shaped groove of he rupturing groove 18 becomes narrow to reach contact. Thereby, this is probably because the inlet portion of the rupturing groove 18 serves as a fulcrum of a lever so that a bottom portion of the rupturing groove 8a is ruptured in a tearing manner, and after rupturing of the rupturing groove 8a and the rupturing groove 18, the straight rupturing grooves 8b are ruptured from the ruptured portion in a tearing manner. Accordingly, since the rupturing valve is opened reliably at a rising time of the battery internal pressure, safety of the battery can be secured.

Figure 5A:
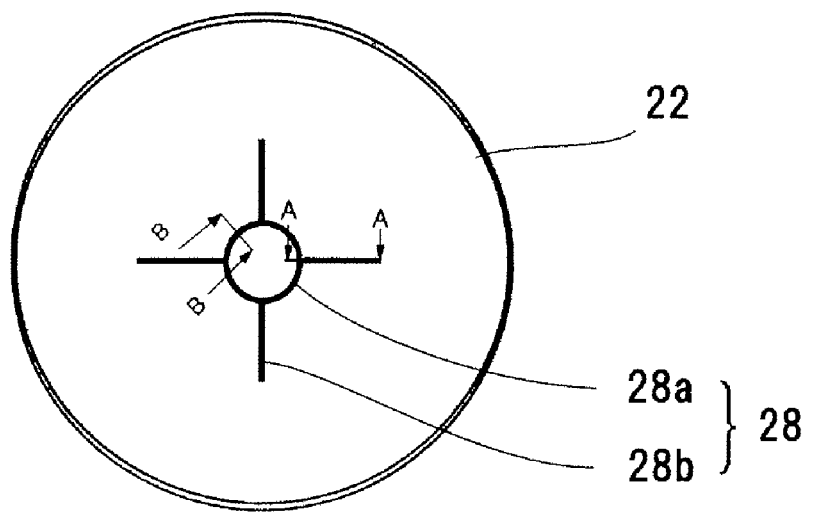
FIGS. 5A to 5C show rupturing grooves formed in a diaphragm configuring the upper lid of the conventional cylindrical lithium ion secondary battery, FIG. 5A being a plan view of the diaphragm, FIG. 5B being a sectional view of the diaphragm taken along line A-A in FIG. 5A, and FIG. 5C being a sectional view of the diaphragm taken along line B-B in FIG. 5A.
Figure 5B:
Figure 5C:

Further, in the conventional lithium ion secondary battery, as shown in FIG. 5B and FIG. 5C, the rupturing groove 28 with a V-shaped section is formed on only the surface of the dish-shaped diaphragm 22 subjected to diaphragm working, which is positioned on the side of the upper lid cap 1. Since the straight rupturing groove 28b configuring the rupturing groove 28 is formed to have an approximately even depth, the central portion of the diaphragm 22 becomes considerably smaller in thickness than the peripheral edge portion thereof in a portion where the rupturing groove 28b is formed. Therefore, for example, the rupturing grooves 28b are ruptured on the side of the peripheral edge of the diaphragm 22 at an overcharged time at a high rate of a current value of 2C or higher before the diaphragm 22 is inverted, which results in a possibility that a current cannot be cut off. On the other hand, in the lithium ion secondary battery 30 according to the embodiment, the rupturing groove 8b is formed such that the depth "c" of the other end of the rupturing groove 8b corresponding to the side of the peripheral edge of the diaphragm 2 is smaller than the depth "a" of the one end thereof crossing the rupturing groove 8a. Therefore, a sufficient thickness of the portion of the diaphragm 2 where the rupturing groove 8b is formed is secured even on the side of the peripheral edge of the diaphragm 2 so that the rupturing groove 8b is prevented from being ruptured before inversion of the diaphragm 2 at a rising time of the battery internal pressure due to overcharging at a high rate. Accordingly, a current can be cut off reliably by inversion of the diaphragm 2 so that safety can be secured.

Incidentally, in the embodiment, the example where the rupturing groove 8 is configured by combining the circularly-curved rupturing groove 8a and the straight rupturing grooves 8b has been shown, but the present invention is not limited to this example. For example, only a circularly-curved rupturing groove may be formed as the rupturing groove 8. In the embodiment, the example where the rupturing groove 8a and the rupturing groove 8 are formed in a circularly-curved shape has been shown, but the present invention is not limited to this example. The rupturing groove 8a and the rupturing groove 8 may be formed in a horseshoe shape or a polygonal shape. Furthermore, in the embodiment, the example where the rupturing grooves 8b are formed at four positions on the diaphragm 2 has been shown, but the present invention is not limited to this example. For example, the rupturing grooves 8b may be formed at sixth positions or eight positions on the diaphragm 2. In the embodiment, the example where the rupturing groove 18 is formed at only a position corresponding to a position of the circularly-curved rupturing groove 8a has been shown, but such a configuration can be adopted that another rupturing groove 18 is also formed at a position corresponding to the straight rupturing groove 8b (the rupturing groove 18 is formed to include both a circularly-curved rupturing groove and a straight rupturing groove). In other words, the rupturing groove 18 is not required to correspond to the whole rupturing groove 8, but it may be formed so as to correspond to at least one portion of the rupturing groove 8, for example, a portion of the circularly-curved portion of the rupturing groove 8.

In the embodiment, the example where the depth "b" of the rupturing groove 18 is set to be smaller than the depth "a" of the rupturing groove 8a has been shown, but the present invention is not limited to this example. Considering that, if the depth "b" of the rupturing groove 18 is larger than the depth "a" of the rupturing groove 8a, the rupturing groove 8a and the rupturing groove 18 may be ruptured at a rapid rising time of the battery internal pressure, it is preferable that the depth "b" is set to be smaller than the depth "a".

Further, in the embodiment, the example of the lithium ion secondary battery has been shown, but the present invention is not limited to this example. For example, the present invention is applicable to a cylindrical secondary battery with a large capacity exceeding 14 Ah. Various materials for the cathode plate, the anode plate, and the separator which configure the electrode winding group 11, and the non-aqueous electrolyte have been shown, but the present invention is not limited to the active materials, the materials, the electrolyte, the solvents, and the like described above, of course. In the embodiment, the example where the upper lid cap 1 connected to the cathode plate of the electrode winding group 11 is also utilized as the cathode external output terminal has been shown, but such a configuration may be adopted that the upper lid cap 1 is connected to the anode plate.

EXAMPLES

Next, Examples of the cylindrical lithium ion secondary battery 30 manufactured according to the embodiment will be explained. Incidentally, a cylindrical lithium ion secondary battery of Comparative Example will also be explained.

In the following Examples and Comparative Example, upper lids 20 were manufactured while the depth "a" (mm) of the rupturing groove 8a with a V-shaped section, the depth "b" (mm) of the rupturing groove 18 with a U-shaped section, and the depth "c" (mm) of the straight rupturing groove 8b positioned on the side of the peripheral edge of the diaphragm 2, these grooves being formed on the diaphragm 2, were changed, and the lithium ion secondary batteries 30 were manufactured. All of the battery capacities were set to 14 Ah. All of the thicknesses of the diaphragms 2 were set to 0.5 mm. The depths "a" of the rupturing grooves 8a, the depths "b" of the rupturing grooves 18, and the depths of he rupturing grooves 8b of the respective Examples and the Comparative Example are shown in the following Table 1. In the following Table 1, the other end portion depth "c" indicates the depth of the rupturing groove 8b positioned on the side of the peripheral edge of the diaphragm 2.

TABLE 1

| Item | Diaphragm plate thickness (mm) | Depth of V-shaped groove a (mm) | Depth of U-shaped groove b (mm) | Depth of the other end c (mm) |
|---|---|---|---|---|
| Comparative Example 1 | 0.5 | 0.25 | 0 | 0.25 |
| Example 1 | 0.5 | 0.10 | 0.30 | 0.30 |
| Example 2 | 0.5 | 0.15 | 0.25 | 0.25 |
| Example 3 | 0.5 | 0.20 | 0.10 | 0.10 |
| Example 4 | 0.5 | 0.25 | 0.10 | 0.20 |

TABLE 1-continued

| Item | Diaphragm plate thickness (mm) | Depth of V-shaped groove a (mm) | Depth of U-shaped groove b (mm) | Depth of the other end c (mm) |
|---|---|---|---|---|
| Example 5 | 0.5 | 0.30 | 0.10 | 0.25 |
| Example 6 | 0.5 | 0.35 | 0.05 | 0.30 |

Example 1

As shown in Table 1, in Example 1, the upper lid 20 was manufactured using the diaphragm 2 where the depth "a" of the rupturing groove 8a was 0.10 mm, the depth "b" of the rupturing groove 18 was 0.30 mm, the depth "c" of the end portion of the rupturing groove 8b was 0.30 mm, and the lithium ion secondary battery 30 was manufactured.

Example 2

As shown in Table 1, in Example 2, the upper lid 20 was manufactured using the diaphragm 2 where the depth "a" of the rupturing groove 8a was 0.15 mm, the depth "b" of the rupturing groove 18 was 0.25 mm, and the depth "c" of the end portion of the rupturing groove 8b was 0.25 mm, and the lithium ion secondary battery 30 was manufactured.

Example 3

As shown in Table 1, in Example 3, the upper lid 20 was manufactured using the diaphragm 2 where the depth "a" of the rupturing groove 8a was 0.20 mm, the depth "b" of the rupturing groove 18 was 0.10 mm, and the depth "c" of the end portion of the rupturing groove 8b was 0.10 mm, and the lithium ion secondary battery 30 was manufactured.

Example 4

As shown in Table 1, in Example 4, the upper lid 20 was manufactured using the diaphragm 2 where the depth "a" of the rupturing groove 8a was 0.25 mm, the depth "b" of the rupturing groove 18 was 0.10 mm, and the depth "c" of the end portion of the rupturing groove 8b was 0.20 mm, and the lithium ion secondary battery 30 was manufactured.

Example 5

As shown in Table 1, in Example 5, the upper lid 20 was manufactured using the diaphragm 2 where the depth "a" of the rupturing groove 8a was 0.30 mm, the depth "b" of the rupturing groove 18 was 0.10 mm, and the depth "c" of the end portion of the rupturing groove 8b was 0.25 mm, and the lithium ion secondary battery 30 was manufactured.

Example 6

As shown in Table 1, in Example 6, the upper lid 20 was manufactured using the diaphragm 2 where the depth "a" of the rupturing groove 8a was 0.35 mm, the depth "b" of the rupturing groove 18 was 0.05 mm, and the depth "c" of the end portion of the rupturing groove 8b was 0.30 mm, and the lithium ion secondary battery 30 was manufactured.

Comparative Example 1

As shown in Table 1, in Comparative Example, the upper lid 40 was manufactured using the diaphragm 22 where the rupturing groove 18 was not formed (b=0), the depth "a" of the rupturing groove 28a was 0.25 mm, and the depth "c" of the end portion of the rupturing groove 28b was 0.25 mm, and the lithium ion secondary battery was manufactured. Accordingly, the Comparative Example 1 was a conventional lithium ion secondary battery where the depth of the rupturing groove 28b was formed to be approximately even (see FIG. 5A and 5B).

(Test and Evaluation)

A 2-parallel cell unit was obtained by using two lithium ion secondary batteries of each of the respective Examples and the Comparative Example and connecting them using a battery connecting bus bar in 2-parallel. Regarding the two-parallel unit, an overcharging test, a nailing test, and a crushing test were conducted and battery behaviors were evaluated. In the overcharging test, the 2-parallel units was charged up to an overcharged state by direct currents of 56 A (2 C per one cell) and 28 A (1 C per one cell). In the nailing test, after each battery was adjusted to SOC (state of charge) of 100%, a nail with a radius of 5.5 mm was hit against a center of the battery in a longitudinal direction thereof from a direction perpendicular to a winding axis of the electrode winding group 11 in a direction orthogonal to a longitudinal direction of the battery at a speed of 1.6 m/min and the battery was pierced by the nail. In the crushing test, after each battery was adjusted to SOC of 100%, a crushing tool with a radius of 17.5 mm was hit against a center of the battery in a longitudinal direction thereof from a direction perpendicular to a winding axis of the electrode winding group 11 in a direction orthogonal to a longitudinal direction of the battery at a speed of 1.6 m/min and the battery was applied with external pressure. The battery behavior in each test was evaluated utilizing four states of mark double ○ indicating that explosion firing was not confirmed regarding 100% of tested batteries; mark ○ indicating that explosion firing was not confirmed regarding 81 to 99% of tested batteries; mark Δ indicating that explosion firing was not confirmed regarding 61 to 80% of tested batteries; and mark x indicating that explosion firing was not confirmed regarding 0 to 60% of tested batteries. The evaluation results of the respective tests are shown in the following Table 2. Incidentally, the number (n) of tests in each test was 20.

TABLE 2

| Item | 1C overcharging test | 2C overcharging test | Nailing test | Crushing test |
| --- | --- | --- | --- | --- |
| Comparative Example 1 | ⊚ | X | X | X |
| Example 1 | ⊚ | X | ○ | X |
| Example 2 | ⊚ | Δ | ⊚ | Δ |
| Example 3 | ⊚ | ○ | ⊚ | ○ |
| Example 4 | ⊚ | ⊚ | ⊚ | ○ |
| Example 5 | ⊚ | ⊚ | ⊚ | ⊚ |
| Example 6 | ⊚ | ⊚ | ⊚ | ⊚ |

Figure 6:
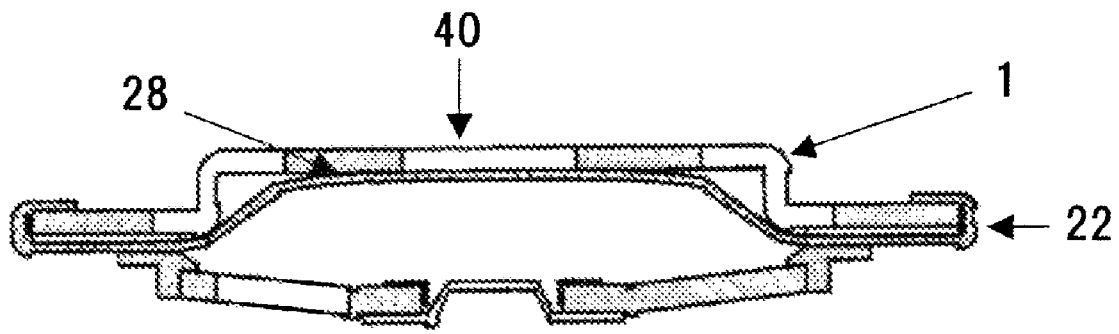
FIG. 6 is a sectional view of the upper lid where the diaphragm has been inverted due to rapid rising of a battery internal pressure in the conventional cylindrical lithium ion secondary battery.

As shown in Table 2, in the lithium ion secondary battery according to the Comparative Example 1 where the rupturing grooves 28a and 28b were formed in the diaphragm 22, the explosion firing was not confirmed at the overcharging test of 1 C, but explosion firing happened at a breaking test accompanying rapid deformation of the battery caused externally such as a nailing test or a crushing test. This will be because the battery internal pressure rises rapidly at a time of deformation and the inverted diaphragm 22 is pressed on a lower portion of the upper lid cap 1 so that rupturing groove 28 is prevented from being ruptured because of high capacity of the battery capacity to 14 Ah (see FIG. 6). Even in the overcharging test of 2 C, explosion firing was confirmed. This is probably because, as the depth "c" of the rupturing groove 28b is set to be equal to the depth "a", the thickness of the diaphragm 22 becomes extremely thin on the side of the peripheral edge in the portion where the rupturing groove 28b has been formed, so that the rupturing groove 28b is ruptured before inversion of the diaphragm 22 and a charging current is not cut off.

On the other hand, in the lithium ion secondary batteries 30 of Example 1 to Example 6 where the rupturing groove 8 and the rupturing groove 18 were formed in the diaphragm 2, explosion firing was not confirmed at the overcharging tests of 1 C, and explosion firing was hardly confirmed at the overcharging test of 2 C, the nailing test, and the crushing test. Especially, in the lithium ion secondary batteries 30 of Example 3 to Example 6, excellent battery behaviors were given. This is probably because the rupturing groove 8a and the rupturing groove 18 are ruptured reliably at the nailing time or the crushing time by setting the depth "b" of the rupturing groove 18 to be smaller than the depth "a" of the rupturing groove 8a without causing pressing of the inverted diaphragm 2 on the upper lid cap 1 and the battery internal pressure is discharged outside the battery. This is probably because the thickness of the portion where the rupturing groove 8b is formed is secured on the side of peripheral edge of the diaphragm 2 at the overcharging time of 2 C by setting the depth "c" on the side of the peripheral edge to be smaller than the depth "a" on the side of the rupturing groove 8a and a current is cut off by inversion of the diaphragm 2 caused before the rupturing groove 8b is ruptured on the side of the peripheral edge of the diaphragm 2.

In the lithium ion secondary batteries 30 of Example 1 and Example 2, explosion firing was confirmed regarding some of batteries at each test. This is probably because, as the depth "b" of the rupturing groove 18 is set to be equal to or more than the depth "a" of the rupturing groove 8a, the rupturing groove 8 and the rupturing groove 18 are ruptured at the nailing or crushing time before inversion of the diaphragm 2 so that a charging current is not cut off, and this is also probably because, as the depth "c" of the rupturing groove 8b is set to be equal to or more than the depth "a", the thickness of the portion where the rupturing groove 8b has been formed is made extremely thin on the side of the peripheral edge of the diaphragm 2 and the rupturing groove 8b is ruptured at the overcharging time of 2 C before inversion of the diaphragm 2 so that a charging current is not cut off.

Accordingly, in the lithium ion secondary battery 30 according to the embodiment, it is proven that safety of the battery can be secured not only at the overcharging time including overcharging at a high rate but also at a battery abnormal time accompanying rapid deformation of the battery due to nailing or crushing.

INDUSTRIAL APPLICABILITY

Since the present invention provides a cylindrical secondary battery which can secure safety even if an external force accompanying rapid deformation of the battery acts on the battery in a battery with a large capacity, it contributes to manufacture and sales of secondary batteries so that the present invention has industrial applicability.

What is claimed is:

1. A cylindrical secondary battery that is provided with a mechanism for cutting off a current due to inversion of a diaphragm caused by internal pressure rising, the diaphragm being formed with a rupturing valve, wherein the rupturing valve is formed with a groove with a V-shaped section on a surface of the diaphragm opposite to a surface thereof on which an internal pressure acts and a groove with a U-shaped section is formed on the surface on which the internal pressure acts so as to correspond to a position where the groove with a V-shaped section is formed, wherein the groove with a V-shaped section is formed by combining a ring-like curved groove and a straight groove whose one end crosses the curved groove, the other end of the straight groove being positioned on the side of an outer periphery of the diaphragm, and the other end of the straight groove is smaller in depth than the one end thereof.

2. The cylindrical secondary battery according to claim 1, wherein a depth of the groove with the U-shaped section is smaller than a depth of the groove with the V-shaped section.

3. The cylindrical secondary battery according to claim 1, wherein the groove with a U-shaped section is formed so as to correspond to at least one portion of a position where the groove with a V-shaped section is formed.

4. The cylindrical secondary battery according to claim 1, wherein the diaphragm is formed such that a central portion thereof is flat, and the diaphragm and an electrically-conductive connection plate which is electrically connected to one of a cathode plate and an anode plate and whose central portion projects toward the diaphragm and is formed in a flat shape are connected electrically and mechanically to each other through the central portions of the diaphragm and the electrically-conductive connection plate.

5. The cylindrical secondary battery according to claim 4, further comprising a battery lid having a disk-shaped lid cap, wherein the lid cap is formed such that a central portion projects and a peripheral edge portion of the lid cap is crimped and fixed at a peripheral edge portion of the diaphragm.

6. The cylindrical secondary battery according to claim 4, wherein connection of the diaphragm with the electrically-conductive connection plate is cancelled when the diaphragm is inverted due to internal pressure rising in the battery.

7. The cylindrical secondary battery according to claim 1, wherein the diaphragm is set such that a rupturing pressure where the rupturing valve is activated is larger than an inverting pressure where the diaphragm is inverted due to internal pressure in the battery.

8. The cylindrical secondary battery according to claim 1, wherein a battery capacity is 3.5 Ah or more.

9. The cylindrical secondary battery according to claim 1, further including an upper lid cap disposed over the diaphragm, wherein said rupture valve ruptures after said diaphragm is inverted but before said diaphragm contacts said upper lid cap.

* * * * *